United States Patent
Najmolhoda

(12)
(10) Patent No.: US 6,457,484 B1
(45) Date of Patent: Oct. 1, 2002

(54) SOLENOID FLUID CONTROL VALVE WITH TWIST-ON CONNECTION

(75) Inventor: Hamid Najmolhoda, Grand Rapids, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/490,488

(22) Filed: Jan. 25, 2000

(51) Int. Cl.[7] .............................................. F16K 31/02
(52) U.S. Cl. .............................. 137/15.18; 251/129.15; 137/315.03; 335/262
(58) Field of Search ........................... 251/129.15, 904; 137/15.18, 315.03; 335/262

(56) References Cited

U.S. PATENT DOCUMENTS

| | | |
|---|---|---|
| 3,223,954 A | 12/1965 | Mateer |
| 3,917,218 A * | 11/1975 | Marocco ................. 251/367 X |
| 5,145,149 A | 9/1992 | Moehle |
| 5,196,817 A | 3/1993 | Jacobs et al. |
| 5,205,531 A | 4/1993 | Kolchinsky |
| 5,302,930 A | 4/1994 | Brehm et al. |
| 5,449,227 A | 9/1995 | Steinberg et al. |
| 5,630,403 A * | 5/1997 | Van Kampen et al. ................. 251/129.17 X |
| 5,647,269 A | 7/1997 | Miller et al. |
| 5,845,672 A | 12/1998 | Reuter et al. |
| 5,871,201 A | 2/1999 | Cornea et al. |
| 5,895,026 A * | 4/1999 | Linkner, Jr. et al. .... 251/129.15 |
| 6,144,275 A * | 11/2000 | Hirata et al. ........ 251/129.15 X |

\* cited by examiner

Primary Examiner—Kevin Lee

(57) ABSTRACT

Solenoid operated fluid control valve is connected to a housing of fluid circuit by a twist-on, fluid tight connection between the housing and a solenoid assembly of the fluid control valve. The solenoid assembly has an armature movable in response to electrical current to a wire coil wound on a bobbin in a solenoid housing for controlling position of a movable valve located in a valve body thereof. The control valve includes a valve-receiving nozzle or body with compressible annular fluid seal on a region thereof that is received within the fluid circuit housing. The solenoid bobbin includes a plurality of connection tabs spaced peripherally apart and adapted to be initially received in entrances to an arcuate groove on the fluid circuit housing. The solenoid assembly is adapted to be connected to the fluid circuit housing by inserting the valve-receiving nozzle or body therein in a manner to radially fluid tight compress the fluid seal with the connection tabs received in the entrances to the groove and then by turning or rotating the fluid control valve to angularly displace the tabs in the groove to axially confined positions therein to hold the fluid control valve in the fluid bore when fluid pressure is present therein.

39 Claims, 3 Drawing Sheets

SOLENOID FLUID CONTROL VALVE WITH TWIST-ON CONNECTION

FIELD OF THE INVENTION

The present invention relates to a solenoid operated fluid control valve having a solenoid assembly connected to a housing typically having one or more fluid bores of a fluid circuit.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional variable force solenoid control valve comprises an outer steel solenoid housing and an aluminum valve member housing joined together mechanically such as by tabs on the steel solenoid housing being crimped about regions of the aluminum valve member housing. The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagnetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing in a manner that the steel housing provides a concentration of flux of the electromagnetic field at the armature. The fluid control valve on the end of the armature moves relative to a valve seat disposed in the aluminum valve housing to communicate a fluid inlet to fluid exhaust ports so as to regulate fluid pressure at fluid control ports in a manner proportional to the magnitude of applied electrical current.

The Najmolhoda U.S. Pat. No. 5,611,370 issued Mar. 18, 1997, also describes a proportional variable force solenoid control valve that includes a substantially non-magnetic common housing for the solenoid and control valve, simplifying valve manufacture and construction while maintaining substantially linear proportional fluid pressure control.

An object of the present invention is to provide a solenoid operated fluid control valve having a twist-on, fluid tight solenoid connection to a housing having one or more fluid bores of a fluid circuit.

Another object of the present invention is to provide a solenoid assembly having features to provide a twist-on, fluid tight connection to a fluid circuit housing.

SUMMARY OF THE INVENTION

The present invention provides a solenoid operated fluid control valve connected to a fluid circuit housing having one or more fluid bores or passages by a twist-on, fluid tight connection between a solenoid assembly and the fluid circuit housing. In one embodiment, the fluid circuit housing includes a fluid bore and groove means disposed about the bore. A valve is disposed in the bore. A solenoid assembly is provided having an armature engaging the valve and movable in response to energization of a solenoid coil. The solenoid assembly includes a plurality of connection tabs axially confined in the groove means against fluid pressure in the fluid bore.

In a particular embodiment of the present invention, the fluid control valve includes a solenoid assembly having an armature movable in response to electrical current to a wire coil wound on a bobbin in a solenoid housing for controlling position of a fluid valve located in a valve body that is connected to the solenoid assembly. The valve body is received in a fluid bore of the fluid circuit housing and includes a compressible annular fluid seal disposed on region thereof that is received within the fluid bore to sealingly engage with the housing. The fluid control valve includes a plurality of connection tabs spaced peripherally apart and adapted to be initially received in entrances to groove means of the fluid housing. For example only, the solenoid coil bobbin and/or the valve body connected to the solenoid assembly includes the connection tabs. The fluid control valve is adapted to be connected to the fluid circuit housing by inserting the valve body therein in a manner to fluid tight compress the fluid seal with the connection tabs received in axial entrances to the groove means and then by turning or rotating the fluid control valve to angularly displace the connection tabs in the groove means to axially confined or trapped positions therein to hold the fluid control valve in the fluid bore when fluid pressure is present in the fluid bore. Rotary movement of the fluid control valve in the groove means is prevented by a connection between an electrical connector of the solenoid assembly and a lead frame which typically is affixed to the fluid circuit housing.

The foregoing and other objects, features, and advantages of the invention will become apparent from the following more detailed description taken with the accompanying following drawings.

DESCRIPTION OF THE INVENTION

Figure 1:
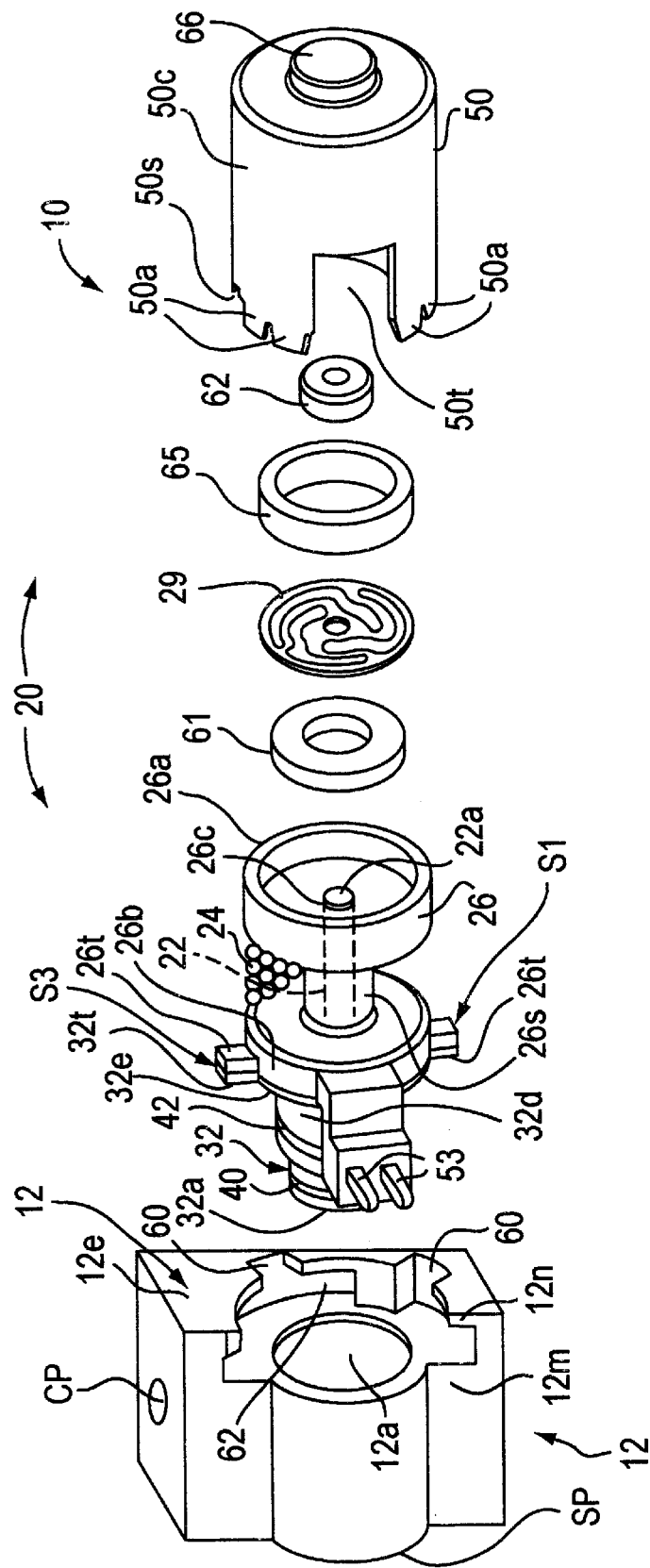
FIG. 1 is an exploded view of a solenoid operated fluid control valve in accordance with an embodiment of the present invention.
Figure 1A:
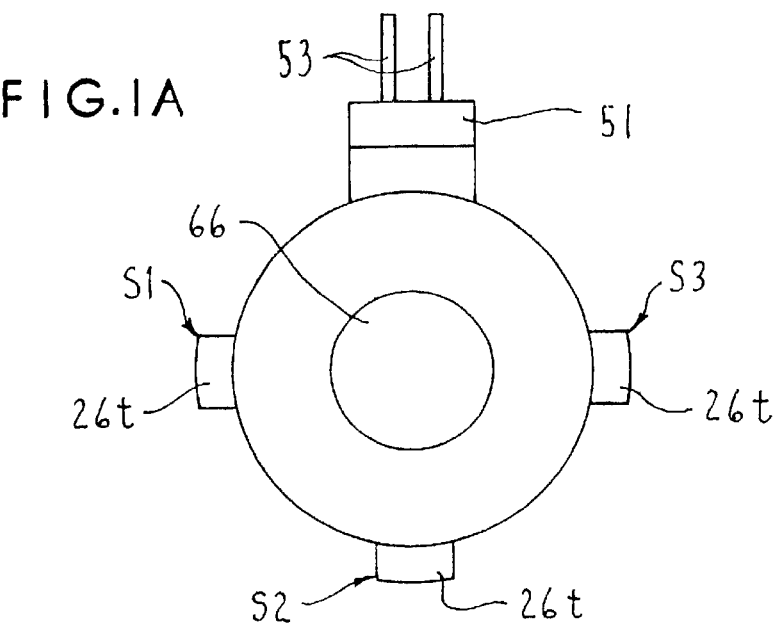
FIG. 1A is an end view of the solenoid assembly.
Figure 2:
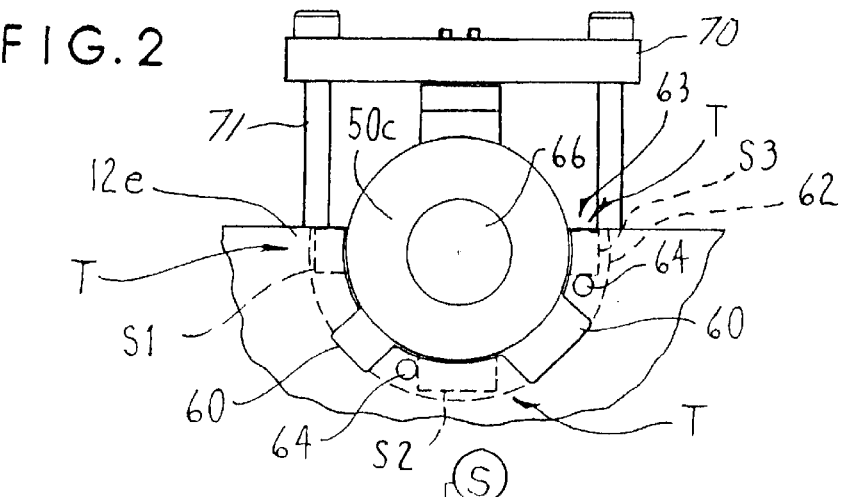
FIG. 2 is an end elevation of the solenoid assembly and fluid circuit housing showing the connection tabs in dashed lines received and axially confined in the arcuate groove of the fluid circuit housing and rotary confined by the solenoid electrical connector connected to a lead frame on the fluid circuit housing.
Figure 3:
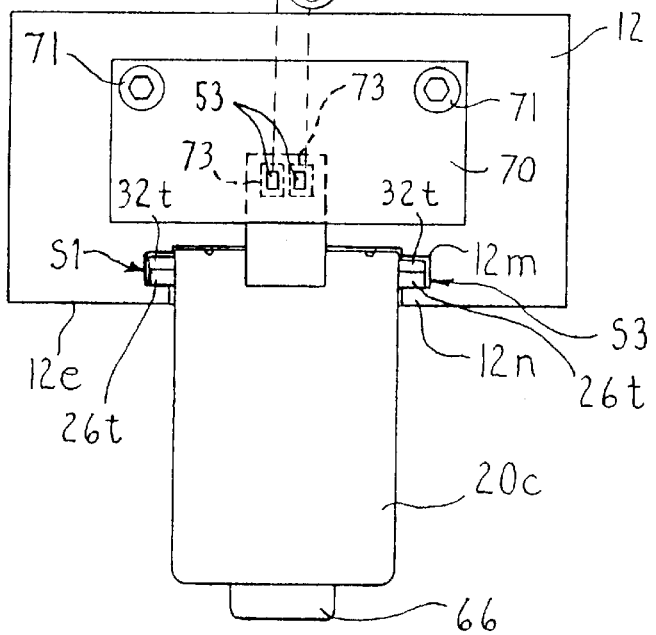
FIG. 3 is a plan view of the solenoid assembly and segment of the fluid housing showing the connection tabs axially abutted in the arcuate groove after fluid pressure is supplied to the fluid circuit housing.

Referring to FIGS. 1–4, a solenoid operated fluid control valve 10 is shown for connection to a fluid circuit housing 12 having a fluid passage or bore 12a forming part of a fluid circuit by a twist-on, fluid tight connection therebetween, FIG. 2–3. An illustrative fluid circuit comprises a hydraulic circuit where pressurized hydraulic fluid is used to actuate or control a hydraulic fluid driven component, such as an vehicle automatic transmission clutch control. However, the invention is not limited to hydraulic circuits and can involve pneumatic, gas and other fluid circuits that employ pressurized fluid to do work.

Figure 4:
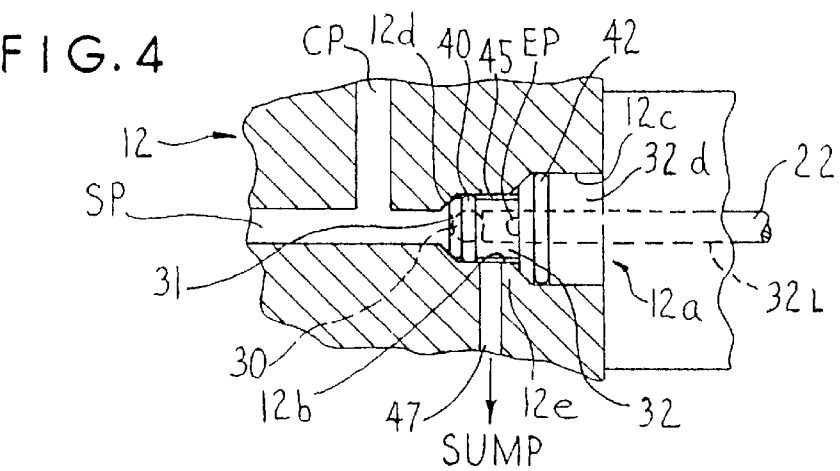
FIG. 4 is a partial sectional view of the fluid circuit housing showing O-ring fluid seals on the valve-receiving nozzle or body of the solenoid assembly compressed in fluid tight manner in the fluid circuit housing before fluid pressure is supplied thereto.

The fluid control valve 10 includes a solenoid assembly 20 having a steel axially elongated armature 22 that includes an end engaged with fluid ball valve 30, FIG. 4, and that is movable in response to energization of a wound wire electromagnetic solenoid coil 24 wound on a plastic coil bobbin 26 for controlling position of ball valve 30. Ball valve 30 is located in a machined (e.g. turned) aluminum or molded thermoplastic valve-receiving nozzle or body 32 relative to a valve seat 31 also provided on the nozzle or body 32. The nozzle or body 32 includes an annular circumferential flange 32f held against annular circumferential shoulder 26s of bobbin 26, FIG. 1C, to join body 32 and bobbin 26 together when the valve components are assembled by crimping the solenoid housing 50 to the bobbin 26 as described below. The nozzle or body 32 includes a longitudinal bore 32l therethrough receiving the armature 22 therein to engage the ball valve 30.

The molded plastic bobbin includes annular end flanges 26a, 26b at opposite ends of central tubular sleeve 26s. The sleeve 26s includes a central longitudinal bobbin bore 26c aligned with the longitudinal bore 32l and in which longitudinal bores the armature 22 is received for axial movement in response to energization (electrical current) of the wire solenoid coil 24. The wire solenoid coil 24 is disposed between flanges 26a, 26b on sleeve 26s of the bobbin 26. The armature 22 can be supported in the axial bobbin bore 26c by a spring plate spring 29 of the type described in the aforementioned Najmolhoda U.S. Pat. No. 4,988,074 and also in Najmolhoda U.S. Pat. No. 5,611,730, the teachings of which are incorporated herein by reference. The spring plate is formed from very thin non-magnetic austenitic stainless steel, such as full hard austenitic stainless steel, which provides a very low rate spring for the spring configuration shown in FIG. 5 of the aforementioned '074 patent. The inner periphery of the plate spring 29 is mounted proximate a rear end 22a of the armature 22 so as to suspend the armature 22 for free axial longitudinal movement within the bores 26c, 32l. The inner periphery of the plate spring 29 is retained on armature 22 by a radially inner, annular plate spring retainer 62 and the outer periphery of the plate spring 29 is retained in position relative to flange 26a of bobbin 26 by a radially outer, annular plate spring retainer 65 as disclosed, for example, in U.S. Pat. No. 5,611,730 and other patents incorporated herein by reference above.

The solenoid assembly includes a permanent ring magnet (e.g. $Nd_2Fe_{14}B$) 61 that provides a permanent magnetic field that interacts with the electromagnetic field of coil 24 that varies in dependence on the coil electrical current level. The permanent ring magnet 61 is retained in position on bobbin 26 by thermal staking as disclosed, for example, in U.S. Pat. No. 5,611,730 an other patents incorporated herein by reference above, or by any other suitable magnet positioning technique. An adjustment cap screw (not shown) may be provided under a cap 66 on housing 50 to adjust the load on an armature biasing spring (not shown) positioned between the end 22a of the armature 22 and the adjustment cap screw in the manner disclosed in U.S. Pat. No. 5,611,370 and the other patents incorporated herein by reference above, thereby adjusting the cracking pressure of the ball valve 30.

A deformable end cap (not shown) on the end of housing 50c also can be used in lieu of an adjustment screw as described in U.S. Pat. No. 5,996,628, incorporated herein by reference.

The solenoid assembly 20 can be a proportional variable force solenoid of the types described in the aforementioned U.S. Pat. Nos. 4,988,074; 5,611,730; 5,996,628; 5,984,259 and applications Ser. No. 09/063,963 where the armature 22 moves axially in proportion to the electrical current level supplied to the coil 24 via electrical connectors 53 disposed on connector housing 51 and connected electrically to coil 24, although the invention is not limited to this type of solenoid and can be practiced with respect to any type of fluid control solenoid for a fluid circuit. The ball valve 30 may be cracked open or not depending upon a particular calibration of the fluid control valve 10.

The valve-receiving nozzle or body 32 includes a radially compressible annular fluid seal 40 such as a resilient fluorocarbon or fluorosilicone O-ring on an axially extending nose region 32a thereof that is received within longitudinal bore 12a of the fluid circuit housing 12, FIG. 4. The nozzle or body 32 also includes a radially compressible annular fluid seal 42, such as a resilient fluorocarbon or fluorosilicone O-ring, on an axially extending, larger diameter nose region 32d that is received within the longitudinal bore 12a of the fluid circuit housing 12, FIG. 4. The bobbin 26 and valve-receiving nozzle or body 32 are assembled together by an outer solenoid housing 50. In particular, the solenoid housing 50 includes a plurality of spaced apart, deformable tabs or shoulders 50a that are crimped or otherwise deformed over the end wall 32e of the nozzle or body 32, FIG. 1B, between radially extending tabs 26t of the bobbin and radially extending tabs 32t of the nozzle or body 32 to secure the bobbin 26, valve nozzle or body 32 and housing 50 together with the armature 22 disposed in the aforementioned longitudinal bores 26c, 32l, with nozzle or body flange 32f held against bobbin shoulder 26s and the other solenoid components held in proper position to one another. The longitudinal bores 26c, 32l, 12a are coaxial when the solenoid housing 50 and the fluid circuit housing 12 are connected as described below.

The solenoid housing 50 can comprise steel, aluminum, aluminum alloy, plastic, or other material that can be fabricated to include the deformable shoulders 50a on the generally cylindrical housing body 50c. A steel or aluminum sheet can be fabricated in appropriate manner to form the housing 50 to this end. Alternately, the solenoid housing can be cast or molded from metal or plastic material to this end.

Figure 1B:
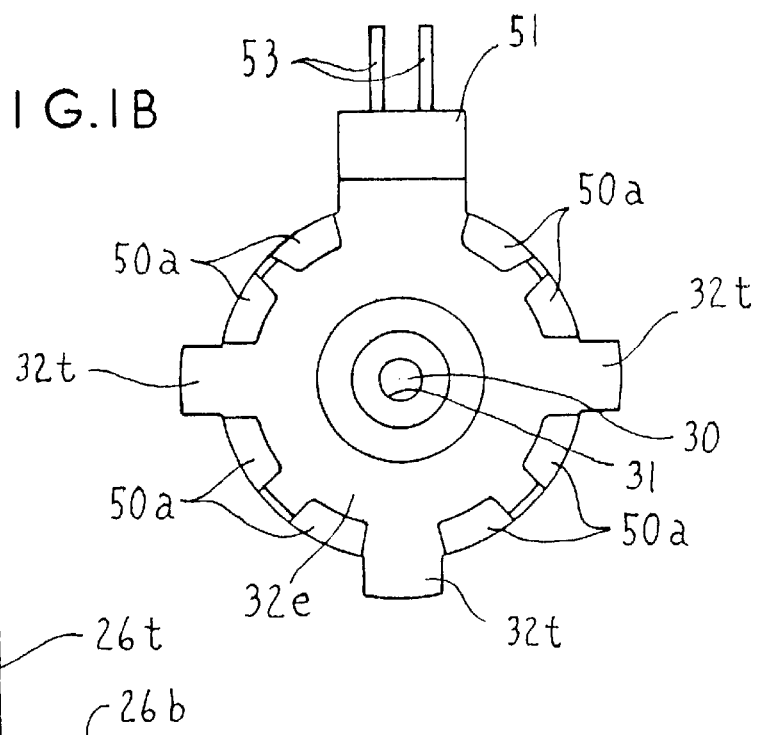
FIG. 1B is an elevational end view of the valve-receiving nozzle or body showing the ball valve.
Figure 1C:
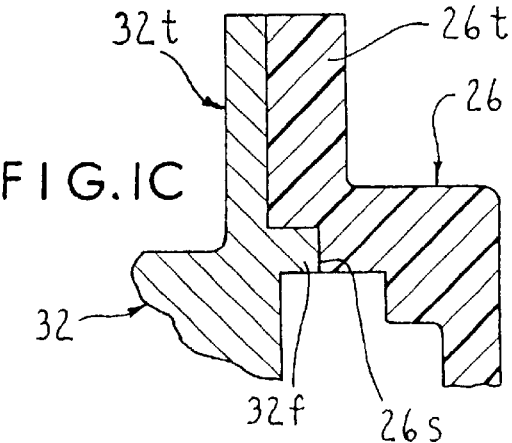
FIG. 1C is a partial cross-sectional view of the connection tabs on the bobbin and valve-receiving nozzle.

Referring to FIGS. 1 and 2, the bobbin 26 is shown including on flange 26b a plurality (e.g. 3) of radially extending, integral connection tangs or tabs 26t spaced peripherally apart and adapted to be initially received in axially extending entrances 60 to arcuate, radius-defined groove 62 in the fluid circuit housing. The tabs 26t are spaced apart circumferentially to this end. The end wall 32e of the valve nozzle or body 32 may include multiple radially extending, integral connection tangs or tabs 32t similar to tabs 26t and spaced peripherally apart so as to register or coincide back-to-back with the tabs 26t to provide three sets S1, S2, S3 of tabs 26t, 32t receivable in the entrances 60 to the grooves 62. The housing 50 includes peripherally spaced apart slots 50s (one shown) to receive each set S1, S2, S3 of abutted tabs 32t, 26t and slot 50t to receive connector housing 51. The connection tangs or tabs can be provided on the bobbin flange 26b and/or end wall 32e of nozzle or body 32. The tangs or tabs 26t, 32t of set S2 can be wider than those of sets S1, S3 for orientation purposes of the fluid control valve relative to the housing 12. Alternately, a separate member (not shown) may be provided as part of the solenoid assembly and/or nozzle or body 32 to have multiple sets of connection tabs similar to tabs 26t, 32t.

The solenoid assembly 20 is adapted to be connected to the fluid circuit housing 12 by axially inserting the nozzle nose regions 32a and 32d into longitudinal bore 12a of the fluid circuit housing 12, FIG. 4, to compress the annular fluid seals 40 and 42 (e.g. O-rings) fluid tight relative to respective cylindrical internal surfaces 12b and 12c of the fluid circuit housing 12 as shown in FIG. 4. The nose regions 32a and 32d can be tapered at their ends complementary to housing surfaces 12d, 12e, respectively. The cylindrical surfaces 12b, 12c are dimensioned to be slightly smaller in inner diameter than the outer diameter of the seals 40, 42 to provide radial compression thereof when the nose regions 32a, 32d are inserted, FIG. 4. For example only, the respective inner diameters of the surfaces 12b, 12c are 8 millimeters and 12 millimeters, while the respective outer diameters of the O-rings 40, 42 are 8.1 millimeters and 12.1 millimeters. The nozzle and bobbin nose regions 32a and 32d are axially inserted in this manner with two sets S1, S2 of the connection tabs 26t, 32t aligned or registered with the entrances 60 to the arcuate groove 62 and the third set S3 of tabs 26t, 32t positioned above the open end 63 of the groove 62, whereby the sets of tabs 26t, 32t are freely axially movable in the entrances 60 to permit insertion of the nose regions 32a, 32d and compression of the O-ring seals 40, 42. Compression of the fluid seals 40, 42 in this manner generates a radial compressive force that is effective to retain the fluid control valve 10 on the fluid circuit housing 12 with the valve nozzle or body 32 retained in fluid tight manner in bore 12a.

After the seals 40, 42 are compressed with the sets S1, S2 of connection tabs 26t received in the entrances 60 to the groove 62, the fluid control valve 10 is turned or rotated (angularly displaced) in a clockwise direction in FIG. 2 to a limited angular extent to angularly displace the sets S1, S2, S3 of tabs 26t, 32t in the groove 62 to axially confined or trapped positions T, FIG. 2, away from the entrances 60. An initial clearance (for example only 0.25 millimeters) is provided between the tab 26t and the housing wall 12n (walls 12m, 12n defining the width of groove 62) when the sets S1, S2, S3 are moved to the trapped positions T in the groove 62. When supply pressure SP is fluid pressurized (for example only 100 to 450 psi), the pressure will force the fluid control valve 10 toward the wall 12n such that the tabs 26t abut the wall 12n, which axially confines the fluid control valve 10 against further axial movement relative to bore 12a, FIG. 3. The axial dimensions of the seals 40, 42 are selected to accommodate this axial movement so that seal 40 does overlap the sump passage 47 when the fluid control valve 10 is subjected to such fluid pressure. Rotary movement of the fluid control valve 10 in groove 62 is prevented by electrical connectors 53 of the solenoid assembly piercing or otherwise engaging electrically conductive traces 73 of a lead frame 70 (or other electrical conductor) affixed to housing 12 by fasteners 71. The fluid control solenoid valve 10 thereby is connected in fluid tight manner to the fluid circuit housing 12. The lead frame conductors 73 are connected to an electrical control signal source S, such as an electronic engine or automatic transmission control control module, and to solenoid coil 24 via connectors 53 and lead wires (not shown) to the solenoid coil to provide electrical current control signals thereto. The groove 62 is machined or formed in the fluid circuit housing 12 to communicate with the axial entrances 60 and extend circumferentially a selected extent therefrom concentric about the bore 12a. For example only, the arcuate groove 62 may have an angular extent of approximately 30 to 40 degrees on the end wall 12e of the housing 12. The groove 62 includes respective stop surfaces 64 formed by separate stop members attached to the housing 12 or by walls formed integral with the housing 12 (in effect forming multiple grooves) to define the extent of angular displacement or travel of the sets of tabs 26t, 32t in the groove 62. That is, the tabs 26t, 32t will abut the stop surfaces 64 at the desired end points of travel of the sets S1, S2, S3 of tabs 26t, 32t in the groove 62 to determine the trapped tab positions T where the tabs are axially confined in the groove 62 between the housing walls 12m, 12n against fluid pressure in bore 12a.

Removal of the fluid control valve 10 from the housing 12 can be effected by disconnecting the connectors 53 from the lead frame 70 and angularly displacing or rotating the fluid control valve 10 in the counterclockwise direction in FIG. 2 to position two sets S1, S2 of the connection tabs 26t, 32t back to the entrances 60 of the groove 62 with the third set S3 of tabs 26t, 32t above and outside the groove 62 and then axially pulling the fluid control valve 10 to disengage the compressed O-ring seals 40, 42 from the bores 12b, 12c to thereby release the fluid control valve 10 and remove it from the housing 12.

The fluid circuit housing 12 includes a supply port SP and a control port CP communicated to one another by fluid passage 12a. The supply port receives pressurized fluid (e.g. 100 to 450 psi hydraulic fluid). The position of the ball valve 30 relative to valve seat 31 is controlled by the armature 22 of the solenoid 10 to exhaust fluid through exhaust ports EP (one shown) on diametrically opposite sides of the valve nozzle or body 32 in a manner that controls fluid pressure at the control port CP in linear proportional as described in the aforementioned U.S. Pat. Nos. 4,988,074 and 5,611,730. The fluid seals 40, 42 are axially spaced apart to define with the passage 12a a fluid exhaust chamber 45 that is communicated with the exhaust ports EP on the valve nozzle or body 32. The exhaust chamber 45 in turn communicates with an exhaust passage 47 that returns to a sump (not shown) of the fluid circuit.

Although the fluid control valve 10 has been described above with the ball valve 30 and its seat 31 disposed on the nozzle or body 32, the invention is not so limited and envisions providing the ball valve 30 and its seat 31 in housing 12 separate from the nozzle or body 32 and yet engaged with the armature 22 of the solenoid assembly to control exhausting of fluid to ports EP. Although certain embodiments of the proportional variable force solenoid valve and fluid control device for an electronic transmission of the invention have been described, it should be understood that variations or modifications may be made without departing from the spirit or scope of the present invention.

I claim:

1. Combination of a housing having a fluid bore for receiving fluid pressure, groove-forming walls disposed on said housing, a valve in said bore, and a solenoid assembly on said housing and having an armature for controlling said valve and movable in response to energization of a solenoid coil, said solenoid assembly having a plurality of connection tabs, said solenoid assembly being connected to said housing by said connection tabs that are moved through respective entrances into respective groove portions formed between said walls and angularly displaced away from said entrances so as to be confined between said walls when fluid pressure is present in said fluid bore.

2. The combination of claim 1 wherein a solenoid coil bobbin includes said connection tabs.

3. The combination of claim 1 further including a valve-receiving body receiving said valve and connected to said solenoid assembly, said body being disposed in said bore and including connection tabs thereon at an exterior region thereof located out of said bore.

4. The combination of claim 3 including a fluid seal on said body for sealingly engaging said housing.

5. The combination of claim 1 wherein a stop surface is disposed between said groove-forming walls to engage a connection tab to limit angular displacement thereof relative to said housing.

6. The combination of claim 1 wherein said housing includes an exterior end with said groove-forming walls disposed on said end concentric about said bore.

7. The combination of claim 1 including a plurality of said entrances extending in an axial direction in one of said groove-forming walls so that a plurality of said connection tabs can be axially inserted into said respective entrances and then angularly displaced away from said respective entrances.

8. The combination of claim 1 wherein the solenoid assembly includes an electrical connector having a connection to an electrical conductor where said connection prevents rotary movement of said solenoid assembly between said groove-forming walls.

9. The combination of claim 1 wherein said tabs are received with clearance between said groove-forming walls so that said solenoid assembly moves in response to fluid pressure in said fluid bore to abut said tabs against an outer one of said groove-forming walls.

10. Combination of a solenoid operated fluid control valve and a housing, said housing having a fluid bore for receiving fluid pressure and groove-forming walls on said housing, said fluid control valve comprising a solenoid assembly having an armature movable in response to energization of a solenoid coil for controlling a movable valve disposed in a valve-receiving body that is connected to said solenoid assembly and received in said bore, said valve body having a compressible fluid seal sealingly engaging said bore, said fluid control valve having a plurality of connection tabs initially registered with respective entrances to respective groove portions formed between said groove-forming walls in a manner that permits insertion of said valve body into said bore to compress said fluid seal and angular displacement of said fluid control valve to position said connection tabs away from said entrances to axially confined positions between said groove-forming walls to hold said fluid control valve on said housing when fluid pressure is present in said fluid bore.

11. The combination of claim 10 wherein a solenoid coil bobbin includes said connection tabs.

12. The combination of claim 10 wherein said valve-receiving body includes said connection tabs.

13. The combination of claim 10 wherein first and second fluid seals are provided on said valve-receiving body to engage said housing.

14. The combination of claim 10 wherein a stop surface is disposed between said groove-forming walls to limit angular displacement of a tab relative to said housing.

15. The combination of claim 10 wherein the solenoid assembly includes an electrical connector having a connection to an electrical conductor where said connection prevents rotary movement of said solenoid assembly between said groove-forming walls.

16. The combination of claim 10 wherein said entrances extend in an axial direction in an outer one of said groove-forming walls so that said tabs can be axially inserted into said respective entrances.

17. The combination of claim 10 wherein said tabs are received with clearance between said groove-forming walls so that said solenoid assembly moves in response to fluid pressure in said fluid bore to abut said tabs against an outer one of said groove-forming walls.

18. The combination of claim 10 wherein a solenoid housing includes a plurality of deformed shoulders disposed between said connection tabs and deformed in a manner to join said bobbin and said valve-receiving body.

19. The combination of claim 18 wherein said solenoid housing comprises a steel can.

20. The combination of claim 18 wherein said solenoid housing comprises an aluminum or aluminum alloy can.

21. A solenoid assembly comprising an armature disposed in a coil bobbin and a solenoid coil on said bobbin, said bobbin having a plurality of radially extending connection tabs.

22. Combination of a solenoid assembly and a valve-receiving body connected together, one of said solenoid assembly and valve-receiving body having a plurality of radially extending connection tabs.

23. The combination of claim 22 wherein said body includes a fluid seal thereon.

24. A method of assembling a solenoid operated fluid control valve to a housing having a fluid bore, comprising inserting a valve-receiving body of a solenoid assembly of said fluid control valve into said bore with a plurality of connection tabs of said fluid control valve received in respective entrances to respective groove portions formed between groove-forming walls on said housing, compressing a fluid seal on said valve body in fluid tight manner in said bore, and angularly displacing said fluid control valve to angularly displace said connection tabs between said groove-forming walls to axially confined positions therebetween to hold said fluid control valve on said housing when fluid pressure is present in said fluid bore.

25. The method of claim 24 including inserting a plurality of connection tabs on a solenoid coil bobbin in said respective entrances in an outer one of said groove-forming walls.

26. The method of claim 24 including axially moving said fluid control valve in response to fluid pressure in said bore to abut said connection tabs against an outer one of said groove-forming walls.

27. Combination of a housing having a fluid bore for receiving fluid pressure and means for forming a groove on said housing, a valve in said bore, and a solenoid assembly disposed on said housing, said solenoid assembly including an armature for controlling said valve and movable in response to energization of a solenoid coil disposed on a coil bobbin in said solenoid housing, said coil bobbin having an integral connection tab extending therefrom transversely of said fluid bore outside of said solenoid housing and axially confined in said groove when fluid pressure is present in said fluid bore.

28. The combination of claim 27 wherein said connection tab extends radially relative to a longitudinal axis of said fluid bore.

29. The combination of claim 28 wherein said connection tab is received with clearance in said groove to permit axial movement of said connection tab and thus said solenoid assembly relative to said housing, said connection tab being axially moved against an outer wall of said groove in response to fluid pressure in said fluid bore.

30. The combination of claim 29 wherein said clearance permits rotary movement of said connection tab and thus said solenoid assembly relative to said housing.

31. The combination of claim 30 wherein a stop surface is disposed in said groove to limit angular rotary motion of said connection tab relative to said housing.

32. Combination of a housing having a fluid bore with a longitudinal axis for receiving fluid pressure and means for forming a groove on said housing, a valve in said bore, and a solenoid assembly disposed on said housing and having an armature engaging said valve and movable in response to energization of a solenoid coil, said solenoid assembly having a connection tab received between walls forming said groove so as to be axially movable and angularly movable between said walls such that said solenoid assembly is axially movable and angularly movable relative to said housing.

33. The combination of claim 32 wherein said solenoid assembly axially moves in response to fluid pressure in said fluid bore so that said tab abuts against an outer one of said walls.

34. Combination of a housing having a fluid bore for receiving fluid pressure, groove-forming walls disposed on said housing, and a solenoid assembly disposed on said housing and having an armature for controlling a valve disposed in a valve body connected to said solenoid assembly, said valve being movable in response to energization of a solenoid coil, a compressible fluid seal on said valve body, said solenoid assembly having a plurality of connection tabs, said solenoid assembly being connected to said housing with said fluid seal compressed in said fluid bore by moving said solenoid assembly to insert said valve body in said fluid bore and to move said connection tabs through respective entrances into respective groove portions formed between said walls and by angularly displacing said solenoid assembly to angularly displace said connection tabs away from said entrances so as to be confined by an outer one of said walls when fluid pressure is present in said fluid bore.

35. The combination of claim 34 wherein a stop surface is disposed between said groove-forming walls to limit angular displacement of a respective connection tab.

36. The combination of claim 34 wherein the solenoid assembly includes an electrical connector having a connection to an electrical conductor where said connection prevents rotary movement of said solenoid assembly between said walls.

37. Combination of a housing having a fluid bore for receiving fluid pressure, means for forming a groove on said housing, a valve in said bore, and a solenoid assembly on said housing having an armature for controlling said valve and movable in response to energization of a solenoid coil, said solenoid assembly having a connection tab, said solenoid assembly being connected to said housing by moving said solenoid assembly toward said fluid bore to move said connection tab through an entrance into said groove and by angularly displacing said solenoid assembly to angularly displace said connection tab in said groove away from said entrance so as to be confined in said groove when fluid pressure is present in said fluid bore.

38. The combination of claim 37 wherein a stop surface is disposed in said groove walls to limit angular displacement of said connection tab.

39. The combination of claim 37 wherein the solenoid assembly includes an electrical connector having a connection to an electrical conductor where said connection prevents rotary movement of said solenoid assembly in said groove.

* * * * *

UNITED STATES PATENT AND TRADEMARK OFFICE
CERTIFICATE OF CORRECTION

PATENT NO. : 6,457,484 B1
DATED : October 1, 2002
INVENTOR(S) : Hamid Najmolhoda It is certified that error appears in the above-identified patent and that said Letters Patent is hereby corrected as shown below:

<u>Column 10,</u>
Line 13, after "housing" insert -- and --.

Signed and Sealed this

Twenty-second Day of July, 2003

JAMES E. ROGAN
*Director of the United States Patent and Trademark Office*